United States Patent
Chuang et al.

[11] Patent Number: 6,062,931
[45] Date of Patent: May 16, 2000

[54] CARBON NANOTUBE EMITTER WITH TRIODE STRUCTURE

[75] Inventors: Feng-Yu Chuang; Wen-Chun Wang, both of Hsin-chu, Taiwan

[73] Assignee: Industrial Technology Research Institute, Hsin-Chu, Taiwan

[21] Appl. No.: 09/387,438

[22] Filed: Sep. 1, 1999

[51] Int. Cl.[7] ..................................................... H01J 9/02
[52] U.S. Cl. .............................................. 445/24; 445/50
[58] Field of Search ........................................ 445/24, 50

[56] References Cited

U.S. PATENT DOCUMENTS

| | | | |
|---|---|---|---|
| 5,458,520 | 10/1995 | DeMercurio et al. | 445/24 |
| 5,679,044 | 10/1997 | Meyer et al. | 445/24 |
| 5,779,514 | 7/1998 | Cheng et al. | 445/24 |
| 5,973,444 | 10/1999 | Xu et al. | |

OTHER PUBLICATIONS

Huang et al., "Growth of Highly Oriented Carbon Nanotubes by Plasme –Enhanced Hot Filament Chemical Vapor Deposition", Applied Physics Letters, vol. 73, No. 26, Dec. 1998, pp. 3845–3847.

Shoushau Fan et al., "Self–Oriented Regular Arrays of Carbon Nanotubes and their Field Emission Propertics", Science, vol. 283, Jan. 22, 1999, pp. 512–514.

*Primary Examiner*—Kenneth J. Ramsey
*Attorney, Agent, or Firm*—George O. Saile; Stephen B. Ackerman

[57] ABSTRACT

An improved cold cathode emitter based on carbon nanotubes has been developed by inserting into the conventional process an extra step in which the diameter of the gate aperture is temporarily reduced by means of a conformally deposited sacrificial layer. This reduced diameter aperture is then used as a mask for the deposition of the catalytic layer. The latter is then converted to a discontinuous layer either by selective etching or by heating until agglomeration occurs. The sacrificial layer is removed, following which carbon nanotubes are grown upwards from the catalytic layer in the normal manner. Because of the greater distance between the tubes and the gate aperture that this process provides, a more reliable product is obtained.

20 Claims, 6 Drawing Sheets

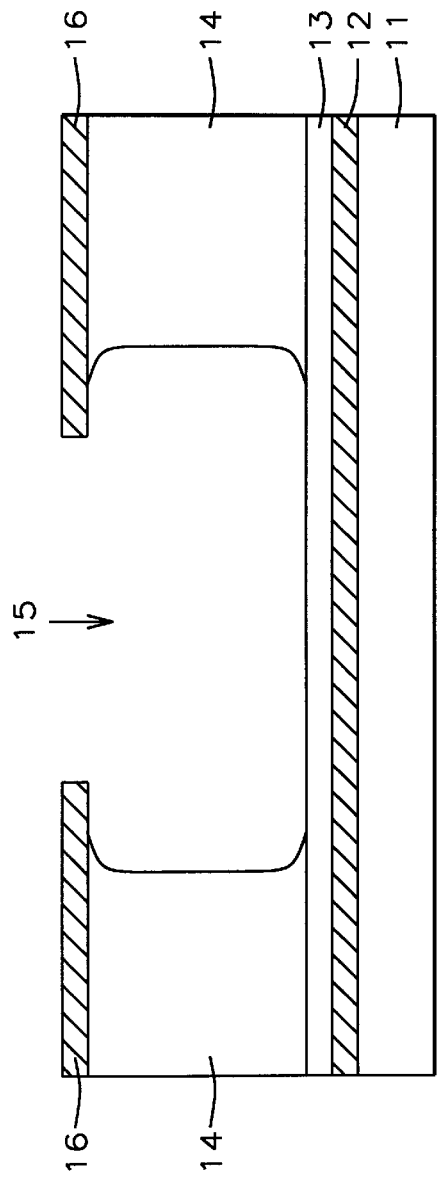
FIG. 1 — Prior Art
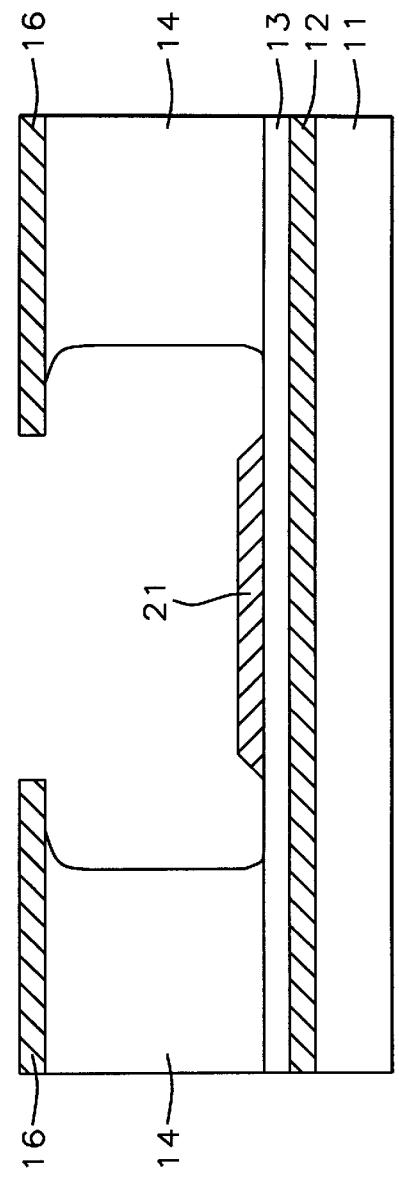
FIG. 2 — Prior Art

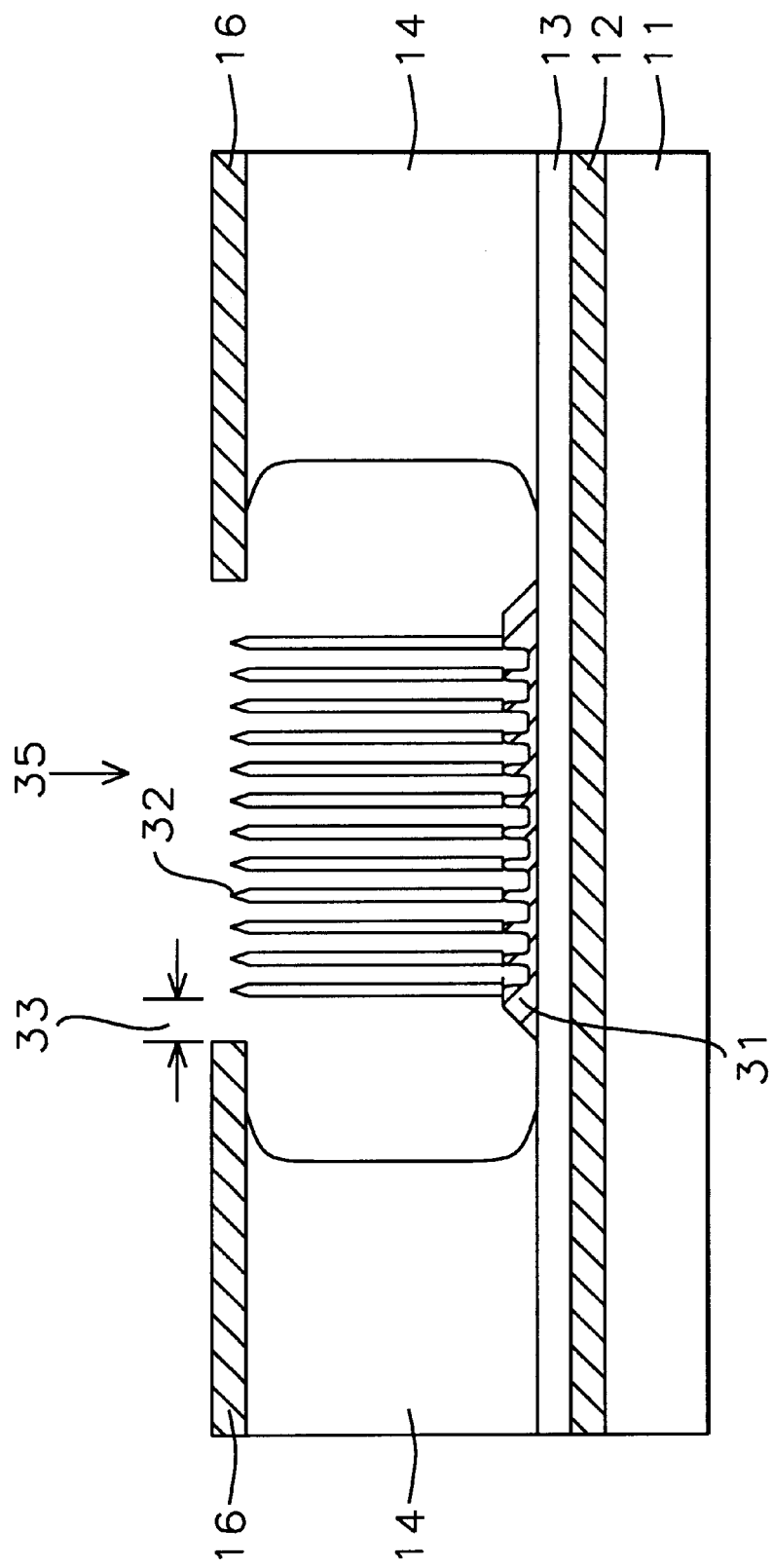
FIG. 3 – Prior Art

CARBON NANOTUBE EMITTER WITH TRIODE STRUCTURE

FIELD OF THE INVENTION

The invention relates to the general field of field emission devices with particular reference to the formation of cold cathode emitters.

BACKGROUND OF THE INVENTION

Cold cathode electron emission devices are based on the phenomenon of high field emission wherein electrons can be emitted into a vacuum from a room temperature source if the local electric field at the surface in question is high enough. The creation of such high local electric fields does not necessarily require the application of very high voltage, provided the emitting surface has a sufficiently small radius of curvature.

The advent of semiconductor integrated circuit technology made possible the development and mass production of arrays of cold cathode emitters of this type. In the past, cold cathode field emission displays have been based on an array of very small conical emitters (typically made of molybdenum), each of which is connected to a source of negative voltage via a cathode conductor line or column. Another set of conductive lines (called gate lines) is located a short distance above the cathode lines at an angle (usually 90°) to them, intersecting with them at the locations of the conical emitters or microtips, and connected to a source of positive voltage. Both the cathode and the gate line that relate to a particular microtip must be activated before there will be sufficient voltage to cause cold cathode emission.

The electrons that are emitted by the cold cathodes accelerate past openings in the gate lines and strike a phosphor layer panel that is located a short distance from the gate lines. Note that, even though the local electric field in the immediate vicinity of a microtip is in excess of 1 million volts/cm., displays of this type could be operated using externally applied voltages of the order of 100 volts. Although such displays are practical, the requirement of maintaining a 100 volts or more across what might be a hand-held device has led to a search for cold cathode devices capable of operating at voltages an order of magnitude or more less than this.

A recent promising approach to solving this problem has been the development of carbon nanotubes. These microtubules have tips whose effective radius of curvature is only about 100 Angstroms so that local electric fields in excess of $10^6$ volts/cm can be generated there with the application of external voltages of between about 10 and 50 volts.

To illustrate the process currently in use in the prior art for the fabrication of a single cold cathode cell based on carbon nanotubes, we refer now to FIG. 1 where we show, in schematic cross-section, the starting point for manufacturing the device. Cathode layer 12 sits atop substrate 11. In an actual display panel, layer 12 would have the form of series of metallic lines generally referred to as cathode columns. At regular intervals along the cathode columns, the cold emitters are to be formed.

Coating layer 12 is catalyst substrate layer 13. It has been found that the catalytic layer from which the nanotubes are grown (see below) is more effective if laid down onto certain substrates. Two examples of a suitable catalyst substrate material are porous silicon and amorphous silicon. With layer 13 in place, dielectric layer 14 is laid down. This layer supports conductive layer 16 which, in a full display, would be used to form gate lines which run orthogonally relative to the cathode lines. Openings 15 in the gate lines 16 are formed at their intersections (overlaps) with the cathode columns. Thus, when sufficient voltage is applied between the gate lines and the cathode columns cold cathode emission is initiated from whatever electron sources are located inside the cavities.

After emerging through the openings 15 in the gate lines, electrons are further accelerated so that they strike a fluorescent screen (not shown) where they emit visible light. Said screen is part of a top assembly which comprises a glass plate coated with a phosphor layer, the space between them being evacuated and then maintained at a vacuum of the order of $10^{-7}$ torr.

In practice, the diameter of the gate opening is made somewhat less than the diameter of the cavity in which the emitter is housed so as to allow more room for the latter. As already noted, said emitter, until recently, has been in the form of a micro-cone. FIG. 2 illustrates the next step in the process used by the prior art when carbon nanotubes are to be used instead. Catalytic layer 21 is laid down by vacuum evaporation, patterned layer 16 acting as a mask for the incoming vapor stream 22.

Layer 21 is then caused to break up into a discontinuous layer of island areas (see later) each of which becomes a micro-catalyst that serves as a nucleation point for the growth of a nanotube. The latter process is achieved through chemical vapor deposition (CVD) from a high carbon density gas such as ethylene or acetylene. The effect of this is illustrated in FIG. 3 which shows layer 31 (originally layer 21 prior to its getting broken up) up from which nanotubes such as 32 have grown. The CVD process is maintained until the tips of these microtubes come level with layer 16, at which point it is terminated.

While the above described process works as described, it can be seen that the geometry of the situation is such that the separation 33 between an outermost nanotube and the inside edge of the gate aperture 35 will be very small and will be independent of the size of said gate aperture. Furthermore, since precise perpendicularity of the nanotubes cannot always be guaranteed, there is a very real danger that the nanotubes may actually touch the gate layer, resulting in a complete short circuit of the emitter. This is the problem that the present invention will deal with.

A routine search of the prior art was done but no references that teach the approach described in the present invention were found. Several references of interest were, however, encountered. In particular, Z. P. Huang et al. (App. Phys. Lett. 73 No. 26, December 1998, pp. 3845–3847) describe the basic process for forming carbon nanotubes while Shoushan Fan et al. (Science 283 January 1999, pp. 512–514) describe the formation of large arrays of nanotubes. They note that these are promising candidates for field emission applications such as flat panel displays, but point out that scaling these devices for use in larger displays continues to be a problem.

SUMMARY OF THE INVENTION

An object of the present invention has been to describe a process for manufacturing a reliable cold cathode emitter structure.

A further object of the present invention has been that said process result in a structure which is largely free of the danger of shorting between the emitter and the gate electrode.

Yet another object of the invention has been that said process result in a cold cathode emitter made up of an array of carbon nanotubes.

These objects of been achieved by inserting into the conventional process an extra step in which the diameter of the gate aperture is temporarily reduced by means of a con formally deposited sacrificial layer. This reduced diameter aperture is then used as a mask for the deposition of the catalytic layer. The latter is then converted to a discontinuous layer either by selective etching or by heating until agglomeration occurs. The sacrificial layer is removed, following which carbon nanotubes are grown upwards from the catalytic layer in the normal manner.

BRIEF DESCRIPTION OF THE DRAWINGS

FIG. 1 shows the basic structure that houses a cold cathode emission element.

FIG. 2 shows how, according to the prior art, a catalytic layer is laid down.

FIG. 3, also of the prior art, shows a finished structure that uses carbon nanotubes as the cold emission elements.

DESCRIPTION OF THE PREFERRED EMBODIMENTS

Figure 4:
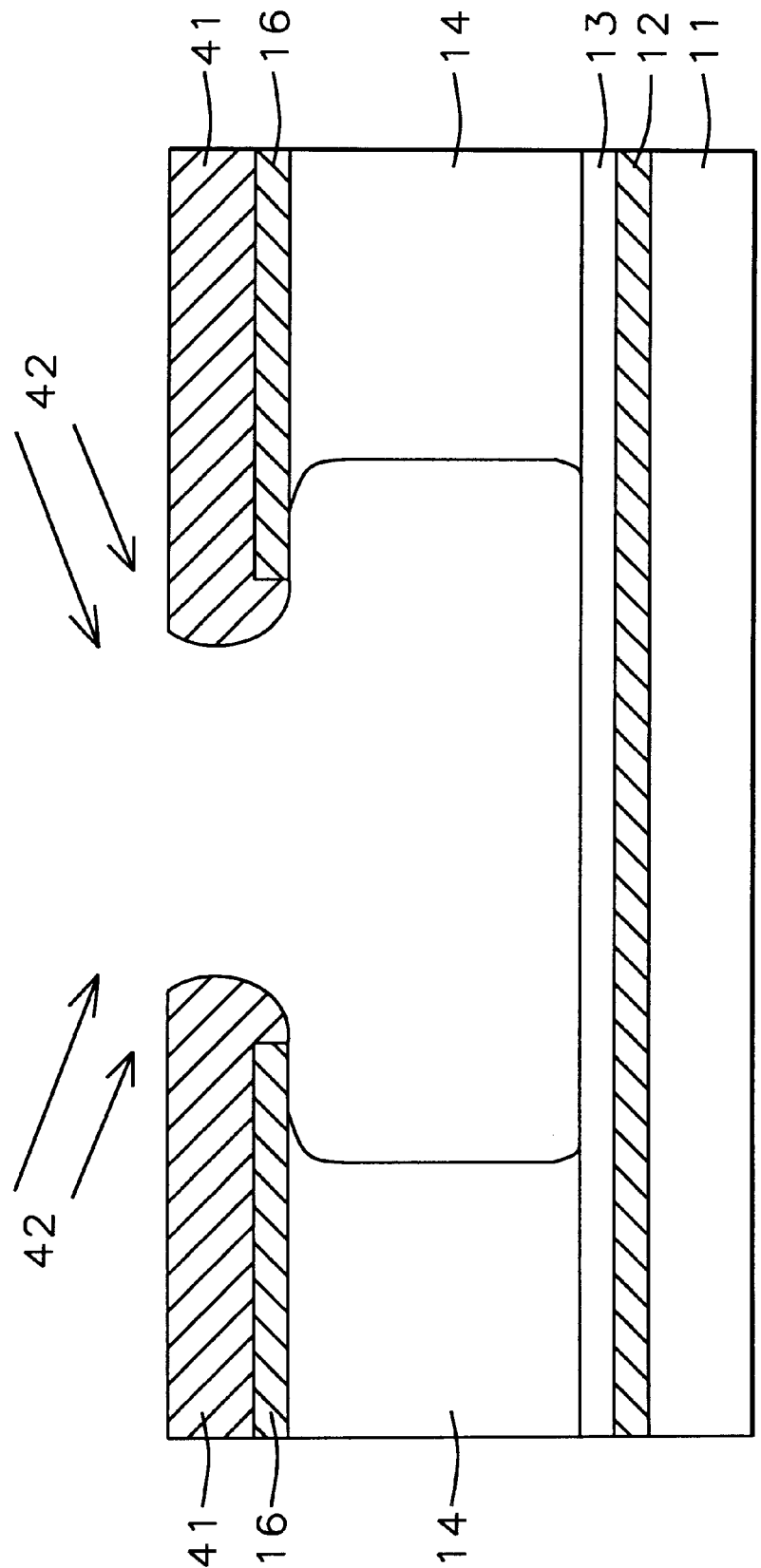
FIG. 4 shows how the diameter of the gate aperture can be reduced.

For purposes of simplification, we will describe the process of the present invention in terms of the formation of a single emission cell, but extension of this to a full array and display panel can be readily envisaged, particularly in light of the earlier description given above.

The process of the present invention has as its starting point the same structure (of the prior art) that is shown in FIG. 1. As seen there, cathode layer 12 sits atop substrate 11 (typically glass or silicon or ceramic. In an actual display panel, layer 12 would have the form of a series of metallic lines generally referred to as cathode columns. Catalyst substrate layer 13 was then deposited over layer 12. This layer makes the catalytic layer that follows it (see below) more effective because the reactive molecules easily permeate the porous structure. Two examples of a suitable catalyst substrate material are porous silicon and amorphous silicon. The catalyst substrate layer is deposited to a thickness between about 1,000 and 2,000 Angstroms.

With layer 13 in place, dielectric layer 14 is laid down to a thickness between about 1 and 2 microns. This layer supports conductive layer 16 which, in a full display, would be used to form gate lines which run orthogonally relative to the cathode lines. Openings 15 in the gate lines 16 are formed at their intersections (overlaps) with the cathode columns. By over-etching dielectric layer 14 conductive layer is under-cut thereby forming an emitter cavity 15 that is somewhat larger than the gate electrode aperture. The diameter of the latter is typically between about 2 and 10 microns.

Referring now to FIG. 4, an important step is added to the process of the prior art. This is the deposition of sacrificial layer 42 onto the gate electrode. This layer coats all or most of the exposed portions of 41 (depending on the process used) including, in particular, the vertical inner edge of the gate aperture. This serves to reduce the inside diameter of the gate aperture by any chosen amount short of closing the aperture entirely. In practice this second, reduced, inner diameter is between about 1 and 9 microns. Our preferred material for the sacrificial layer has been aluminum. Deposition of the sacrificial layer can be accomplished by one of several means including vacuum evaporation at grazing incidence (shown schematically in FIG. 4 as vapor stream 42) either from a ring source or from a fixed source while rotating the substrate or by electroplating. In general, the sacrificial layer is deposited to a thickness between about 0.5 and 1 microns.

Figure 5:
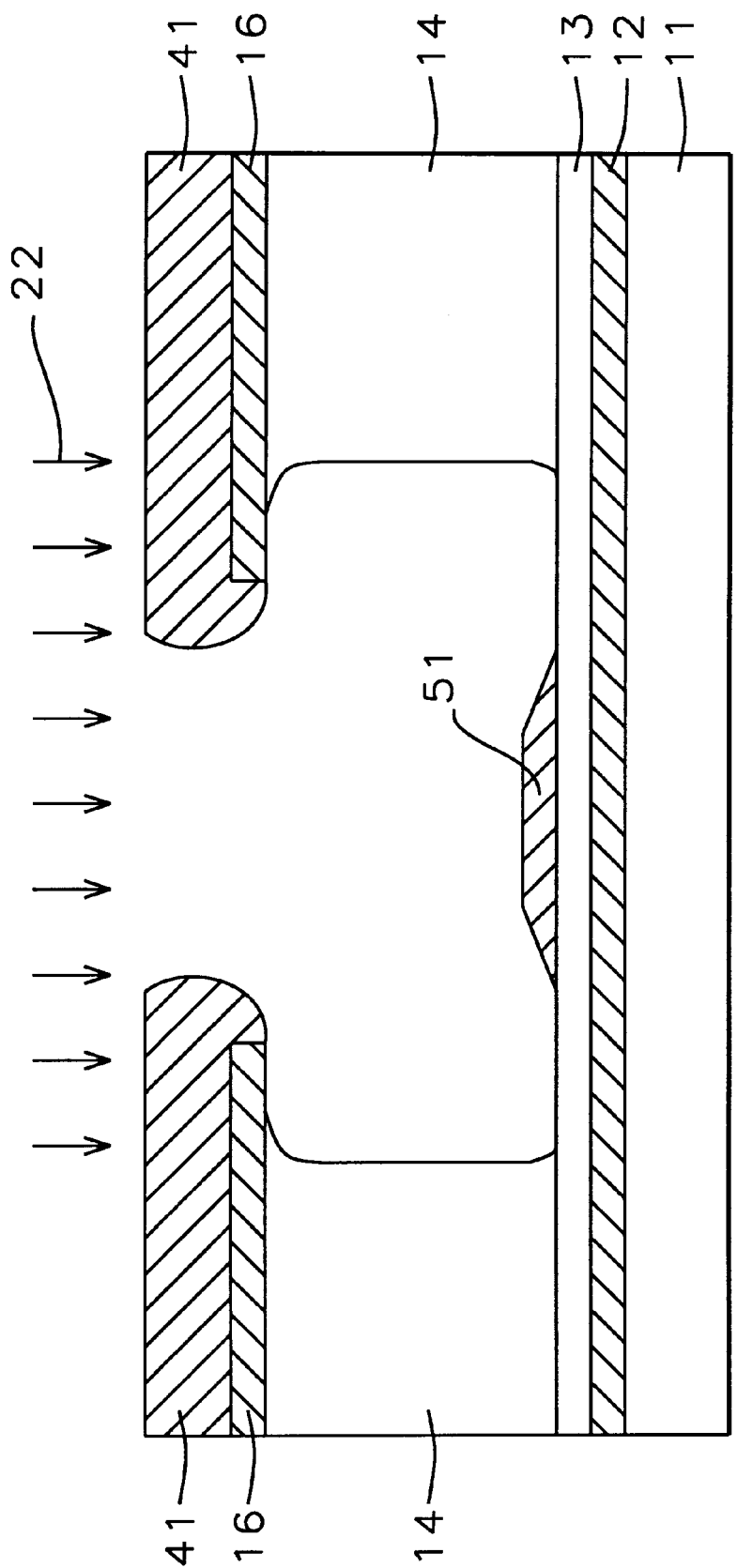
FIG. 5 shows the formation of the catalytic layer as taught by the present invention.

The modified gate aperture is now left in place so that, as illustrated in FIG. 5, it can be used as the mask for the deposition of catalytic layer 51 onto catalyst substrate layer 13 (schematically shown by vapor stream 22 in FIG. 5). Several candidates are available for use as a catalytic layer. These include iron, nickel, cobalt, and other transition metals. The catalytic layer is deposited to a thickness between about 100 and 500 Angstroms. Once this has been done, sacrificial layer 41 is selectively removed.

Figure 6:
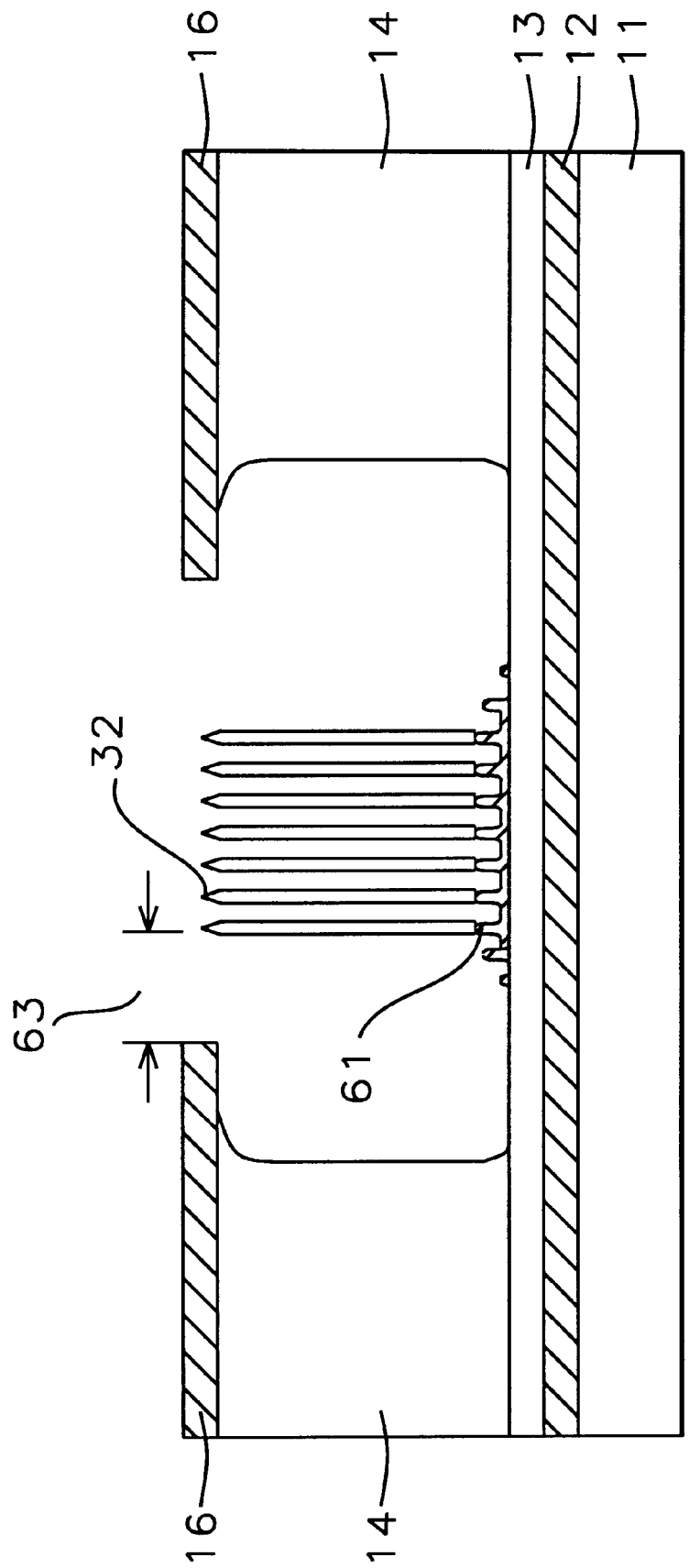
FIG. 6 shows the finished structure with, in particular, a safe distance left between the carbon nanotubes and the gate layer.

The process of the present invention is then completed in conventional manner. First, catalytic material 51 is converted to discontinuous layer 61 as shown in FIG. 6. This can be accomplished in several ways. For example, the film can be caused to agglomerate by heating it to between about 450 and 500° C. for between about 10 and 30 minutes or the film may be etched in ammonia at a temperature between about 500 and 600° C. for between about 5 and 10 minutes. Then the array of carbon nanotubes, such as 32, is formed through growth vertically upwards from the island areas that make up layer 81. Our preferred process for forming the carbon nanotubes has been microwave plasma enhanced chemical vapor deposition (CVD) at a substrate temperature below 700° C. Formation of the nanotube array is terminated when their tips reach the level of the gate aperture.

Figure 7:
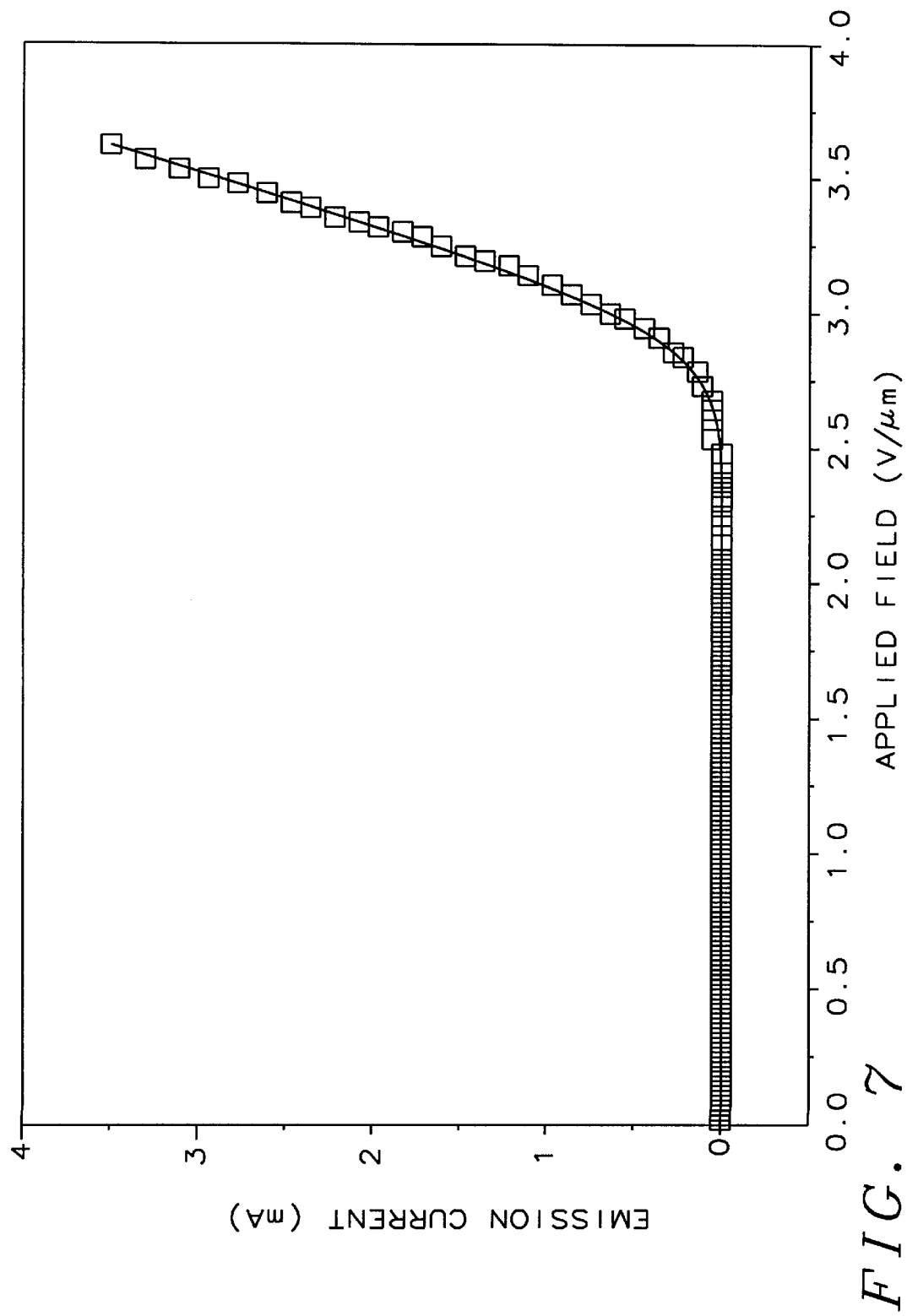
FIG. 7 is a plot of emission current vs. applied electric field for a typical cold emitter made up of carbon nanotubes according to the process of the present invention.

The effectiveness of the above described process is illustrated by the data shown in FIG. 7. Seen there is a plot of emission current vs. applied electric field expressed in volts/micron. This data is for a single cell containing between 400 and 4,00 nanotubes, giving an array of about $10^4$ emitters. Since the voltage is applied across a separation of about one micron (corresponding to distance 63 in FIG. 6) the actual voltage needed to run the display is of the same order. Thus, a field emission display panel manufactured according to the teachings of the present invention will operate at a voltage difference of between about 10 and 50 volts between the cathode and gate lines and between about 1,000 and 10,000 volts between the cathode lines and the phosphor screen.

While the invention has been particularly shown and described with reference to the preferred embodiments thereof, it will be understood by those skilled in the art that various changes in form and details may be made without departing from the spirit and scope of the invention.

What is claimed is:

1. A process for forming a cold cathode emitter, comprising:

provided a substrate and then successively depositing on said substrate a first conducting layer, a catalyst substrate layer, a dielectric layer, and a second conducting layer;

patterning and etching the second conductive layer and dielectric down to the level of the catalyst substrate layer, then selectively over-etching the dielectric layer so as to undercut the second conductive layer, thereby forming an emitter cavity whose topmost layer is a gate electrode having a gate aperture with a first internal diameter;

depositing a sacrificial layer onto the gate electrode, whereby the gate aperture is given a second internal diameter that is less than said first diameter;

using the gate aperture as a mask, depositing a layer of a catalytic material on said catalyst substrate layer;

selectively removing the sacrificial layer;

converting said layer of catalytic material to a discontinuous layer of island areas;

forming an array of carbon nanotubes, having tips, by growing the nanotubes vertically upwards from said island areas; and terminating formation of the nanotube array when said tips are level with the gate aperture.

2. The process of claim 1 wherein said first inner diameter is between about 1 and 9 microns.

3. The process of claim 1 wherein said second inner diameter is between about 2 and 10 microns.

4. The process of claim 1 wherein the sacrificial layer is aluminum.

5. The process of claim 1 wherein the step of depositing a sacrificial layer further comprises evaporation at grazing incidence or electroplating.

6. The process of claim 1 wherein the sacrificial layer is deposited to a thickness between about 0.5 and 1 microns.

7. The process of claim 1 wherein the step of converting the catalytic layer to a discontinuous layer further comprises heating at between about 450 and 500° C. for between about 10 and 30 minutes or etching in ammonia at a temperature between about 560 and 600° C. for between about 5 and 10 minutes.

8. The process of claim 1 wherein the catalytic layer is selected from the group consisting of iron, nickel, cobalt, and the transition metals.

9. The process of claim 1 wherein the step of forming the carbon nanotubes further comprises using microwave plasma enhanced chemical vapor deposition, at a substrate temperature below 700° C. on a catalytic layer.

10. The process of claim 1 wherein the dielectric layer has a thickness between about 1 and 2 microns.

11. The process of claim 1 wherein the substrate is glass or silicon or ceramic.

12. The process of claim 1 wherein the catalytic layer is deposited to a thickness between about 100 and 500 Angstroms.

13. The process of claim 1 wherein the catalyst substrate layer is deposited to a thickness between about 1,000 and 7,000 Angstroms.

14. A process for manufacturing a field emission display panel, comprising:

providing an insulating substrate and then forming cathode columns thereon;

depositing a catalyst substrate layer on the cathode columns;

depositing a dielectric layer on said substrate and on said catalyst substrate layer;

forming gate lines on said first dielectric layer, over and orthogonal to, said cathode columns;

forming openings, having a first diameter, at all overlaps of said cathode columns and said gate lines, extending through the gate lines and through the dielectric layer;

over-etching the dielectric layer whereby openings etched in the insulating layer have a greater diameter than the openings previously etched in the gate lines;

depositing a sacrificial layer thereby reducing said openings to a second internal diameter that is less than said first diameter;

using the sacrificial layer as a mask, depositing a layer of a catalytic material on said catalyst substrate layer;

selectively removing the sacrificial layer;

converting said layer of catalytic material to a discontinuous layer of island areas;

forming an array of carbon nanotubes, having tips, by growing the nanotubes vertically upwards from said island areas;

terminating formation of the nanotube array when said tips are level with the gate openings; and permanently positioning a conductive phosphor screen above said openings.

15. The process of claim 14 wherein said first inner diameter is between about 2 and 10 microns.

16. The process of claim 14 wherein said second inner diameter is between about 1 and 9 microns.

17. The process of claim 14 wherein the sacrificial layer is aluminum.

18. The process of claim 14 wherein the step of depositing a sacrificial layer further comprises evaporation at grazing incidence or electroplating.

19. The process of claim 14 wherein the sacrificial layer is deposited to a thickness between about 0.5 and 1 microns.

20. The process of claim 14 wherein said field emission display operates at a voltage difference of between about 10 and 50 volts between the cathode and gate lines and between about 1,000 and 10,000 volts between the cathode lines and the phosphor screen.

* * * * *